US012125648B2

(12) United States Patent
Haberer et al.

(10) Patent No.: US 12,125,648 B2
(45) Date of Patent: Oct. 22, 2024

(54) ELECTRICAL BREAKING MODULE EQUIPPED WITH A MAGNETIC BLOW-OUT DEVICE AND ELECTRICAL BREAKING APPARATUS COMPRISING SUCH A MODULE

(71) Applicant: SOCOMEC, Benfeld (FR)

(72) Inventors: Arthur Haberer, Illkirch-Graffenstaden (FR); Jérôme Hertzog, Griesheim-Pres-Molsheim (FR)

(73) Assignee: SOCOMEC, Benfeld (FR)

( * ) Notice: Subject to any disclaimer, the term of this patent is extended or adjusted under 35 U.S.C. 154(b) by 0 days.

(21) Appl. No.: 18/558,254

(22) PCT Filed: May 10, 2022

(86) PCT No.: PCT/EP2022/062695
§ 371 (c)(1),
(2) Date: Oct. 31, 2023

(87) PCT Pub. No.: WO2022/243119
PCT Pub. Date: Nov. 24, 2022

(65) Prior Publication Data
US 2024/0234043 A1 Jul. 11, 2024

(30) Foreign Application Priority Data
May 21, 2021 (FR) ....................................... 2105345

(51) Int. Cl.
*H01H 1/48* (2006.01)
*H01H 1/36* (2006.01)
(Continued)

(52) U.S. Cl.
CPC .............. *H01H 1/48* (2013.01); *H01H 1/365* (2013.01); *H01H 9/346* (2013.01); *H01H 9/443* (2013.01); *H01H 71/38* (2013.01)

(58) Field of Classification Search
CPC ............ H01H 1/48; H01H 1/42; H01H 1/365; H01H 9/365; H01H 9/346; H01H 9/443;
(Continued)

(56) References Cited

U.S. PATENT DOCUMENTS 3,248,505 A * 4/1966 Mayer .................... H01H 9/341 218/34
4,401,870 A * 8/1983 St-Jean .................... H01H 9/34 218/26
(Continued)

FOREIGN PATENT DOCUMENTS

CN 211719469 * 10/2020 ............... H01H 9/34
EP 2980821 A1 2/2016
(Continued)

OTHER PUBLICATIONS

Translation of CN211719469 (Original document published Oct. 20, 2020) (Year: 2020).*

*Primary Examiner* — William A Bolton
(74) *Attorney, Agent, or Firm* — FORGE IP, PLLC

(57) ABSTRACT

An electrical breaking module includes a non-magnetic, electrically insulating casing housing, a fixed contact and a movable contact defining between them a breaking zone in which an electric arc extends at its origin when the electrical circuit is opened. A magnetic blow-out device is provided with at least one magnetic field source arranged in a breaking chamber, opposite the breaking zone to move and stretch the electric arc in a direction substantially perpendicular to the breaking plane towards the housing. The magnetic blow-out device also includes a non-magnetic, electrically insulating deflector, arranged in the breaking chamber to occupy most of the space between the breaking zone and the casing, so as to create at least one arc confinement zone, in
(Continued)

which the electric arc when magnetically blown is deflected and constrained to promote its cooling and extinction.

13 Claims, 8 Drawing Sheets

(51) Int. Cl.

| | |
|---|---|
| ***H01H 9/34*** | (2006.01) |
| ***H01H 9/44*** | (2006.01) |
| ***H01H 71/38*** | (2006.01) |

(58) Field of Classification Search
CPC .. H01H 9/44; H01H 9/32; H01H 9/34; H01H 71/38
USPC ............................ 218/22–24, 26, 30, 31, 34
See application file for complete search history.

(56) References Cited

U.S. PATENT DOCUMENTS

| | | | | |
|---|---|---|---|---|
| 9,076,606 | B2 * | 7/2015 | Schneider | H01H 9/443 |
| 9,299,509 | B2 * | 3/2016 | Coquil | H01H 1/2041 |
| 9,431,197 | B2 * | 8/2016 | Engewald | H01H 33/182 |
| 9,478,373 | B2 * | 10/2016 | Välivainio | H01H 1/365 |
| 10,176,945 | B2 * | 1/2019 | Domejean | H01H 77/108 |
| 10,319,542 | B2 * | 6/2019 | Hertzog | H01H 9/46 |
| 2014/0319099 | A1 * | 10/2014 | Baujan | H01H 33/08 218/41 |
| 2019/0326073 | A1 * | 10/2019 | Strand | H01H 1/42 |
| 2020/0286692 | A1 * | 9/2020 | Kolmonen | H01H 19/64 |

FOREIGN PATENT DOCUMENTS

| | | |
|---|---|---|
| FR | 3006101 | 11/2014 |
| WO | WO2012110523 A1 | 8/2012 |

* cited by examiner

ELECTRICAL BREAKING MODULE EQUIPPED WITH A MAGNETIC BLOW-OUT DEVICE AND ELECTRICAL BREAKING APPARATUS COMPRISING SUCH A MODULE

TECHNICAL AREA

This invention relates to an electrical breaking module equipped with a magnetic blow-out device, said breaking module comprising a non-magnetic, electrically insulating housing at least one fixed contact and one moving contact, said moving contact being designed to move relative to said fixed contact between a closed position and an open position and vice versa along a path defining a breaking plane, said fixed contact and said moving contact defining between them a breaking zone extending into said breaking plane, in which an electric arc extends at its origin, in particular when the electrical circuit is opened, said breaking module comprising at least one breaking chamber delimited by the inner walls of said housing and comprising said breaking zone for managing said electric arc with a view to breaking the current, and said magnetic blow-out device comprising at least one magnetic field source arranged in said breaking chamber opposite said breaking zone.

The invention also relates to an electrical breaking apparatus comprising at least one control module and said electrical breaking module defined above.

PRIOR ART

Magnetic blow-out of the arc is a principle commonly used in breaking technologies to manage the arc that arises, in particular, when an electrical circuit is opened, with the aim of improving breaking performance and preserving the integrity of the fixed and moving contacts of the breaking module. The magnetic field, which may be generated by any type of magnetic field source, enables the arc to be displaced as soon as it arises, and stretched rapidly to accelerate cooling until it is extinguished. Cooling the arc plasma increases its impedance, which in turn increases the arc voltage during breaking. Breaking direct current (DC) requires the breaking module to generate more voltage than the mains voltage to be broken. This is why the magnetic blow-out principle is particularly well suited to DC breaking. However, a high arc voltage is also of interest when breaking alternating current (AC), as it enables the current to be limited during breaking, thereby reducing arc damage and even shortening the arc time through a limiting effect. As a result, the magnetic blow-out principle is just as interesting for DC currents as for AC currents.

The applicant's publication FR 3 006 101 A1 proposes an electrical breaking module equipped with a non-polarized magnetic blow-out device, which has the advantage of operating independently of the direction of the current in said breaking module. For this purpose, the magnetic blow-out device includes a magnetic field source, such as a permanent magnet, arranged in such a way that the breaking response is unchanged regardless of the current direction. Placing the magnet in front of the breaking zone allows the arc to be blown out to a large extent. Magnetic blow-out results in a lengthening of the arc and an arc column that licks the insulating inner walls of the housing. Together, these two phenomena tend to cool the arc plasma, increasing its impedance. As a result, the arc voltage rises sharply, making it possible to break higher DC voltages.

However, the quest for improved breaking performance is omnipresent.

EP 2 980 821 A1 proposes a magnetic blow-out solution that is unsatisfactory for many reasons. The single central magnet is far from the breaking zone, resulting in a high magnetic field loss in the breaking zone and making magnetic blow-out difficult. The magnetic arms that extend the central magnet generate a concentration and distortion of the magnetic field, which is counterproductive for arc blow-out. The electromotive force induced by the magnetic field on the arc is not directed towards the arms, but perpendicular to them, which is also counterproductive for arc blow-outs. In addition, the magnetic arms leave a large volume of air around the breaking zone, allowing the arc to recoil and reform or reclash between the fixed and moving contacts, which is dangerous for equipment and people.

And publication WO 2012/110523 A1 proposes a solution for extinguishing the arc not by magnetic blow-out but by creating arc confinement imposed by mechanical displacement, commonly known as a guillotine. This principle of arc management is very violent in terms of the arc plasma, and may generate significant overvoltages that are harmful or even dangerous to the electrical mains you wish to interrupt.

Disclosure of the Invention

The aim of this invention is to improve the magnetic blow-out device described in the applicant's publication by proposing a solution that further accelerates arc plasma cooling, with a view to generating even more arc voltage when the current is interrupted, while retaining a non-polarized breaking solution that can be easily adapted to different configurations of electrical breaking apparatus, and enabling the choice of less efficient and therefore less expensive magnets.

To this end, the invention relates to an electrical breaking module of the kind indicated in the preamble, characterized in that said magnetic blow-out device further comprises at least one non-magnetic and electrically insulating deflector, arranged in said breaking chamber to form a physical obstacle in the path of the electric arc when it is magnetically blown, and occupy the major part of the space existing between said breaking zone and said housing, so as to create in the narrow gap remaining between the insulating walls of said deflector and those of said housing, at least one arc confinement zone in which said electric arc, when magnetically blown, is deflected and constrained to promote its cooling and extinction.

The addition of the non-magnetic deflector in the breaking chamber has the effect of immediately deflecting the arc plasma path in the direction of the induced electromagnetic force, stretching the blown arc as far as possible from the breaking zone to avoid recladding, and constraining it in a narrow gap between insulating walls to promote cooling and accelerate extinction.

Alternatively, said breaking chamber may extend on either side of said breaking plane, symmetrically or not, and said deflector may also extend on either side of said breaking plane, symmetrically or not, to define at least two arc confinement zones in opposition to said breaking plane.

In a preferred embodiment of the invention, said at least one magnetic field source can be oriented to generate at least one magnetic excitation vector substantially parallel to said breaking plane so that the induced electromagnetic force displaces and stretches said electric arc in a direction substantially perpendicular to said breaking plane towards the housing and into said at least one arc containment zone.

According to the selected embodiments, the deflector may be movable and integral with the movable contact, or fixed and integral with said housing.

In addition, said deflector may be made up of a plurality of fins or plates spaced apart and oriented substantially perpendicular to said breaking plane. It may also be made of a solid or openwork monoblock.

In the preferred form of the invention, said deflector can have a C-shaped cross-section, substantially symmetrical with respect to the breaking plane, comprising two lugs separated by a central opening designed to free a passage for the relative movement of said movable contact or said fixed contact depending on whether said deflector is fixed or movable.

The said magnetic blow-out device may also comprise at least one carcass arranged to channel the magnetic flux induced by the said at least one magnetic field source, this carcass may or may not be integrated into the housing and arranged around at least the said magnetic field source and the said deflector.

Alternatively, said at least one field source may be static and integral with said housing, or mobile and integral with said mobile contact. In addition, said movable contact may be rotatable about said central axis or translatable parallel to said breaking plane.

If the electrical breaking module comprises two fixed contacts symmetrical with respect to a central axis or median plane of said housing, and a moving contact common to the two fixed contacts defining two symmetrical breaking zones, then it advantageously comprises two symmetrical breaking chambers, and at least two non-magnetic, electrically insulating deflectors, each arranged in one of the breaking chambers.

BRIEF DESCRIPTION OF THE DRAWINGS

This invention and its advantages will become clearer in the following description of several non-limiting example embodiments, with reference to the appended drawings, in which.

DESCRIPTION OF THE EMBODIMENTS

In the illustrated embodiments, the identical elements or parts bear the same reference numbers. Furthermore, terms having a relative meaning, such as vertical, horizontal, right, left, front, rear, above, below, etc., are to be interpreted under normal conditions of use of the invention, and as represented on the figures. Furthermore, the geometrical positions indicated in the description and claims, such as "perpendicular", "parallel", "symmetrical", are not limited to the strict sense defined in geometry, but extend to geometrical positions which are close, i.e., which accept a certain tolerance in the technical field considered, without influencing the result obtained. This tolerance is notably introduced by the adverb "sensibly", without this term necessarily being repeated before each adjective.

With reference to the figures, the electrical breaking apparatus 1 according to the invention may be interchangeably any of the following: a cutoff switch, a switch-disconnector, a contactor, a switch, a changeover switch, a circuit breaker, or any other similar breaking apparatus. It is designed to be mounted on a DIN rail, a base plate or any suitable mounting bracket. It can be designed to break low-voltage direct current (i.e., below 1500V), such as in photovoltaic or similar applications, or medium-voltage direct current, such as 2000V or 3000V for special applications, without these values and examples being limitative. It can also be used to break alternating current in all types of industrial, tertiary and domestic applications, regardless of the nominal supply voltage.

The electrical breaking apparatus 1 may or may not be based on a modular architecture. If the apparatus is modular, then with a single control module 2 it can control one or more breaking modules 3, 3', for example one to eight breaking modules, without this number being limitative. The control module 2 is not part of the invention and will not be described. Only the breaking module 3 forms part of the invention and will be described in detail, it being specified that it can form an integral part of said electrical breaking apparatus when the latter is not modular. The term "module" should therefore not be interpreted in a restrictive sense.

Each breaking module 3, 3' forms a switch pole, which can interchangeably be a single switch pole with one fixed contact CF and one moving contact CM, or a double switch pole with two fixed contacts CF and one common moving contact CM. In all cases, the moving contact CM is arranged to move relative to the fixed contact(s) CF between a closed position and an open position and vice versa on a path defining a breaking plane P. The relative movement of the moving contact CM can interchangeably be rotary or linear.

In addition, the fixed CF and movable CM contacts can interchangeably be sliding, pressure or any other type of compatible electrical contact.

Figure 1:
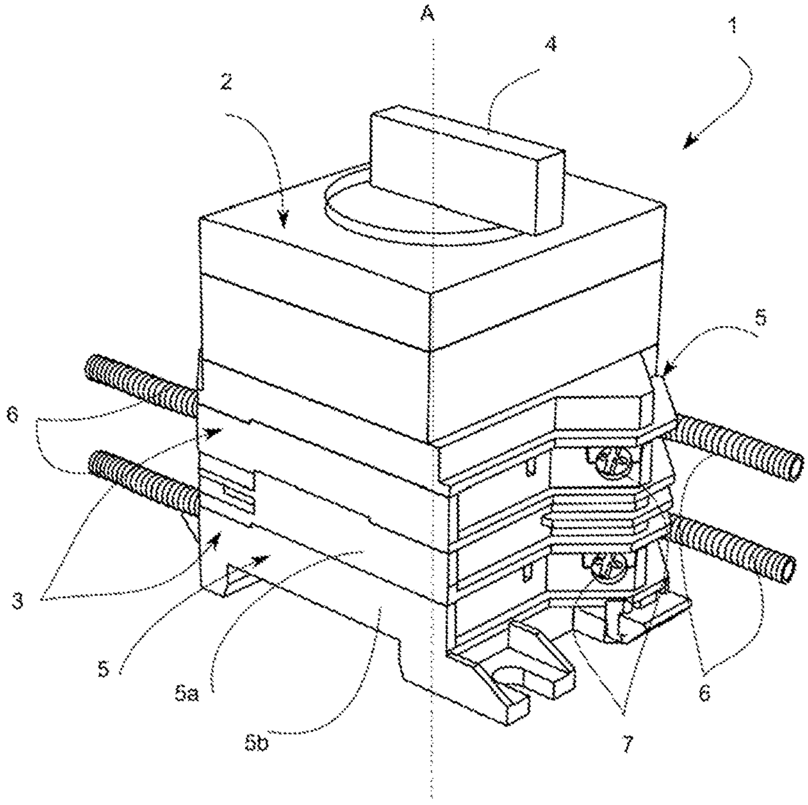
FIG. 1 is a perspective view of an electrical breaking apparatus according to the invention.
Figure 2:
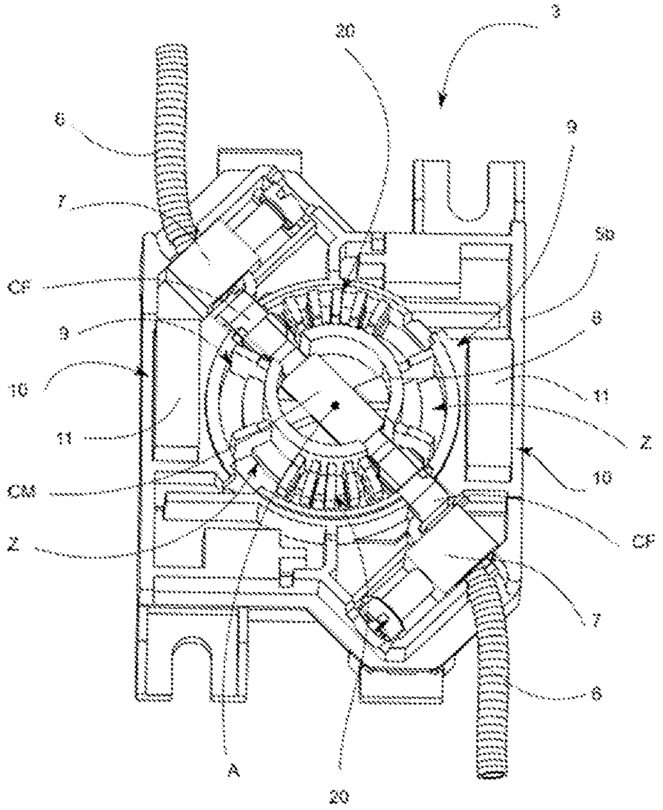
FIG. 2 is a perspective top view of a rotary breaking module of the apparatus shown in FIG. 1, in the closed position.
Figure 3:
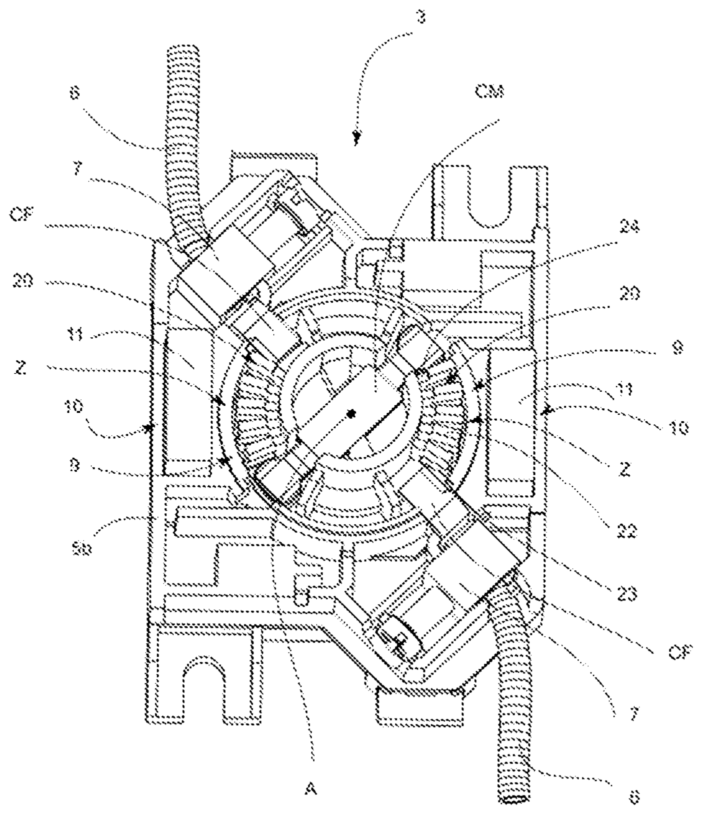
FIG. 3 is a top perspective view of the breaking module shown in FIG. 2, in the open position.
Figure 4:
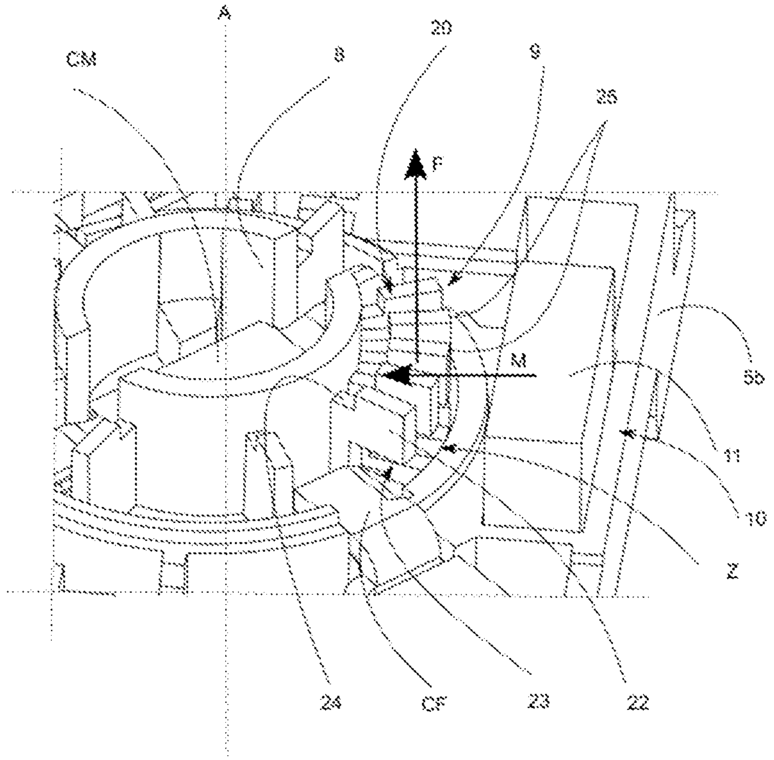
FIG. 4 is an enlarged view of Detail IV of the breaking module in FIG. 3, showing a magnetic blow-out device.

The electrical breaking apparatus 1, hereinafter also referred to as breaking apparatus 1 or apparatus 1, according to the invention and as illustrated in FIG. 1, comprises two double breaking modules 3, and a manual control module 2 provided with a handle 4. These three modules are superimposed along a central axis A, and held together by complementary interlocking shapes and fasteners (not shown). Each breaking module 3 can have a defined breaking capacity, for example equal to 750V, thus providing, in the example shown, an apparatus 1 capable of breaking a voltage of 1500V, without this example being limiting. The breaking modules 3 are preferably identical, and only one breaking module 3 will be described below.

Also with reference to FIGS. 2 to 8, the breaking module 3 comprises a non-magnetic, electrically insulating housing 5, in which at least two fixed contacts CF and one moving contact CM are housed. The housing 5 is preferably made in two interlocking parts 5*a*, 5*b*, defining between them housings to receive the other than components of said breaking module and simultaneously ensure their positioning, retention, and electrical insulation. The fixed contacts CF are connected to external conductors 6 via cage screws 7, or any other type of suitable terminal. The moving contact CM is a rotary contact, mounted on an electrically insulated rotary spindle 8. The rotating spindle 8 is driven in alternating rotation about the central axis A by a snap-action mechanism (not shown) provided in the control module 2. The snap-action mechanism forming part of the control module 2 is also not the subject of the invention and will not be described. Any type of control module 2 and snap-action mechanism may therefore be suitable for the shut-off module 3 covered by the invention.

The fixed contact CF and the moving contact CM define between them respectively two breaking zones Z, in which an electric arc E extends, particularly when the electrical circuit is opened. The electric arc E is represented schematically by a cord in FIGS. 5 to 7 and only in the breaking zone Z on the right-hand side of the figures. In the example shown, the breaking zones Z are diametrically opposed. They extend in the said breaking plane P, in which the electric arc E is inscribed at its origin.

The breaking module 3 comprises two breaking chambers 9, which are delimited by the inner walls of the housing 5 and each comprise one of the breaking zones Z. Breaking chambers 9 are used to manage the electric arc E in order to quench the current. In the example shown, the breaking chambers 9 are diametrically opposed with respect to the central axis A and symmetrical with respect to the median plane coinciding with the breaking plane P. This example is not limitative, since asymmetrical breaking chambers can be envisaged, without calling into question either the operation or the non-polarity of the magnetic blow-out devices 10.

The breaking module 3 also includes a magnetic blow-out device 10 for the electric arc E. In the example shown, the magnetic blow-out device 10 comprises two static magnetic field sources 11, each arranged close to and opposite a switch-off zone Z. The fact that they are each located opposite a breaking zone Z makes it possible to create a maximum magnetic field directly in the breaking zone and a virtually constant magnetic field throughout the breaking chamber 9 for optimum magnetic blow-out of the electric arc E. The magnetic field sources 11 are isolated from the said breaking zone Z by the inner walls of the housing 5. In the example shown, each magnetic field source 11 is oriented to generate a magnetic excitation vector M substantially parallel to the breaking plane P. Thus, the electromagnetic force F induced by each magnetic field source 11 moves and stretches the corresponding electric arc E in a direction substantially perpendicular to the breaking plane P towards the bottom of parts 5*a*, 5*b* of housing 5, and this independently in one direction or the other depending on the polarity of the magnetic field source 11 and/or said current. However, the invention is also suitable for magnetic blow-out devices which may have a different architecture, offering both non-polarized and polarized breaking, and blow-outs of the arc towards other walls of the housing 5.

The magnetic field source 11 may consist of one or more permanent magnets, or any other equivalent system capable of generating a magnetic excitation vector, such as one or more electrically powered coils. In the examples shown, the magnetic field source 11 consists of a permanent magnet with a flat, parallelepiped shape, without this shape being limitative. The numerical reference 11 will be used interchangeably to designate the magnetic field source and the magnet(s). In fact, it is possible to design a magnetic field source 11 whose shape is adapted to the architecture of the breaking module, which may be curved, as in the case of a rotary breaking apparatus, for example. In this case, it may consist of a plurality of parallelepiped permanent magnets arranged side by side on a curved line, or of a permanent magnet molded into a curved shape. The characteristics of the permanent magnet, as well as its technical effects on the blow-out and stretching of the electric arc, are described in particular in the applicant's publication FR 3 006 101 A1, and will not be detailed in this application.

Figure 7:
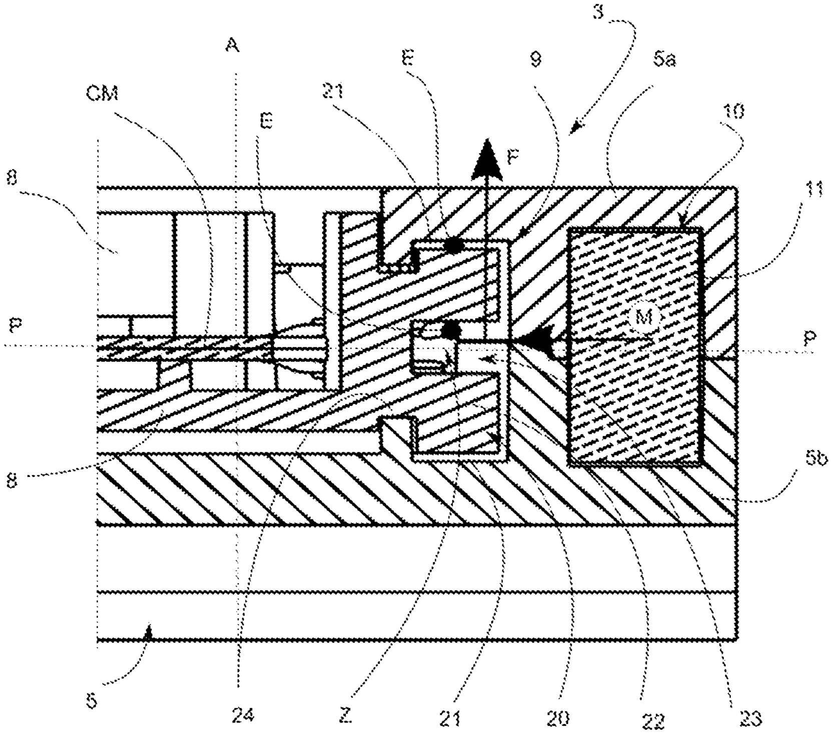
FIG. 7 is a partial cross-sectional view of the breaking module shown in FIG. 3, in line with a breaking chamber and a magnetic blow-out device.

The magnetic blow-out device 10, in accordance with the invention, differs from that described in the above-mentioned publication in that a non-magnetic, electrically insulating deflector 20 is present in said breaking chamber 9. This deflector 20 is designed and arranged to occupy, fill or fulfill a major part of the breaking chamber 9, i.e., the space existing between the breaking zone Z and the housing 5, and to leave one or more narrow spaces or gaps between the insulating walls of said deflector and those of said housing. The deflector 20 thus forms an entirely non-magnetic physical obstacle, interposed in the path of the blown arc, and reduces to a minimum the volume of air remaining in said breaking chamber 9. At least one of the remaining narrow spaces or gaps then constitutes an arc confinement zone 21, in which the electric arc E when magnetically blown is deflected and constrained to promote its cooling and extinction. This arc confinement zone 21 is mainly located at a distance from and in line with the breaking zone Z in the direction of the electromotive force F. FIG. 7 illustrates the arc confinement zones 21 obtained thanks to the presence of the deflector 20 located mainly between the bottom of the parts 5*a*, 5*b* of the housing and the corresponding ends of the lugs 22 of the deflector 20. However, depending on the architecture of the magnetic blow-out device, the arc confinement zone(s) 21 may be located elsewhere, between the corresponding side or transverse walls of said deflector 20 and said housing 5.

In the example shown in FIGS. 2 to 7, the deflector 20 is movable and forms an integral part of the moving contact CM, and therefore of the rotating spindle 8. It has a C-shaped cross-section, symmetrical with respect to the breaking plane P. It comprises two lugs 22 separated by a central opening 23. The central opening 23 frees a passage for the relative displacement of the fixed contact CF with respect to the moving contact CM in the breaking plane P. The deflector 20 has a shoulder 24 between lugs 22 and rotating spindle 8, which together with housing 5 delimits a groove for rotation guidance of said rotating spindle 8. The shape of the deflector 20 and that of the means for guiding the rotary spindle 8 in rotation can be different depending on the architecture of the breaking module 3. In this example, the deflector consists of a plurality of fins 25, for example five fins 25, without this number being limitative. The fins 25 are oriented perpendicularly to breaking plane P. They are distributed over breaking zone Z, which extends over an angular sector, in the case of a rotary breaking module. The gap between two consecutive fins 25 is regular, but could be irregular. This example is therefore not limitative.

The inner walls of housing 5 have a shape substantially complementary to the shape of deflector 20, for example lugs 22, with a defined clearance to create said arc confinement zones 21. Thus, the inner walls of housing 5 also have a geometric shape that is substantially symmetrical with respect to the breaking plane P in the example shown, without this example being limiting. As already mentioned, the symmetry of the chambers 9 with respect to the aforementioned breaking plane P guarantees equivalent breaking performance, whatever the polarity of the magnets 11 and the direction of the current, if the magnets are also arranged symmetrically with respect to the aforementioned breaking plane P. The same result is possible if the chambers 9 are not symmetrical if the magnets 11 are also arranged non-symmetrically. In all cases, non-polarized operation of the magnetic blow-out device 10 is guaranteed.

Figure 5:
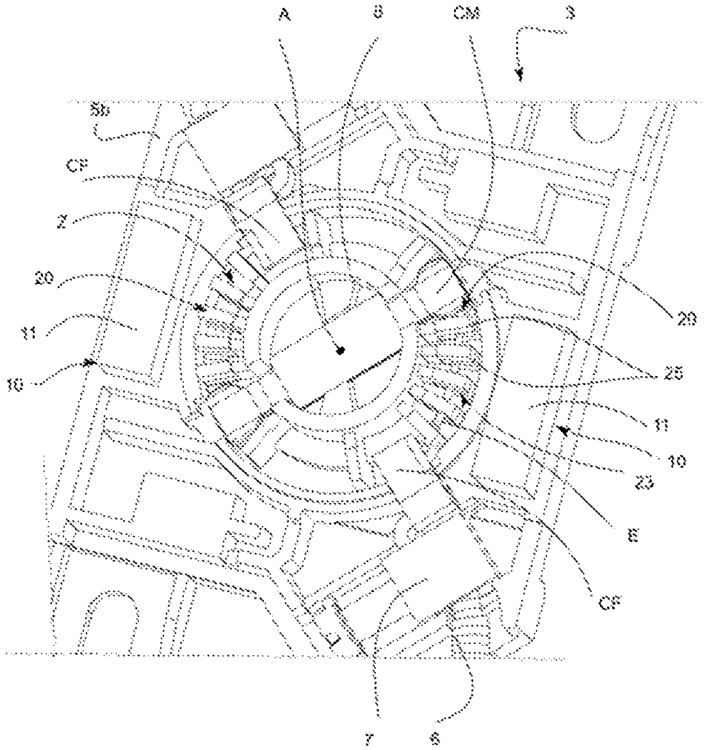
FIG. 5 is an enlarged partial view of the breaking module shown in FIG. 3, showing the path of an arc as it originates in the breaking chamber.
Figure 6:
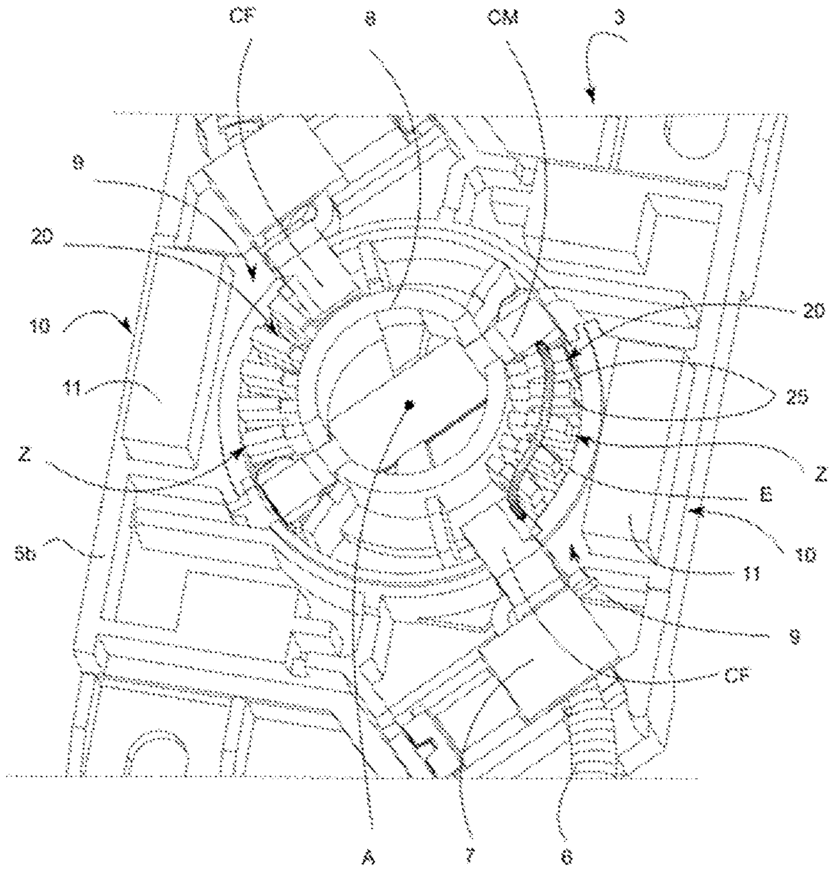
FIG. 6 is a view similar to FIG. 5, showing the path of the arc magnetically blown into the breaking chamber.

When the electrical circuit is opened and the moving contact CM leaves the fixed contact CF, an electric arc E is established in the breaking zone Z between the fixed contact CF and the moving contact CM, and flows through the central opening 23 of the deflector 20 (see FIG. 5). The magnetic blow-out induced by magnet 11 in the breaking zone Z tends to push the electric arc E perpendicular to the plane of breaking P in the direction of housing 5. The deflector 20 interposed in the path of the blown arc E forms a non-magnetic physical obstacle which immediately deflects the arc plasma path in the direction of the electromotive force F, into the confinement zone 21 between the end of the lugs 22 of the deflector 20 and the housing 5. At the same time, the gaps between the fins 25 of the deflector 20, on the one hand, and between the deflector 20 and the inner walls of the housing 5, on the other, form unidirectional exhaust columns that promote the expansion of the arc plasma towards the confinement zone 21 and its cooling on contact with the insulating walls of the deflector and housing 5. In arc confinement zone 21, the electric arc E is stretched, elongated and clamped between the corresponding insulating walls of housing 5 and deflector 20. The electric arc E then cools down abruptly. This cooling technique is particularly fast and highly efficient. In addition, the electrically insulating materials making up housing 5 and deflector 20 are preferably non-magnetic materials that have no effect on the magnetic field generated by magnets 11 and do not interfere with the arc's magnetic blow-out. These materials can further enhance the technical effect described above, particularly if they have gas-forming properties. These may be thermoplastic materials such as Teflon® or similar, which release hydrogen particles on contact with the electric arc E, mixing with the arc plasma and accelerating its cooling.

This new breaking principle offers a gain in breaking performance, as it enables a high arc voltage to be achieved. It also makes it possible to reduce the magnetic field required and to use magnets 11 of lower quality and cost, such as ferrite-type magnets or similar, instead of high-quality, rare-metal and expensive magnets such as neodymium iron boron.

In addition, the breaking principle described above can be easily adapted to a variety of different applications, some examples of which are described below.

Figure 16:
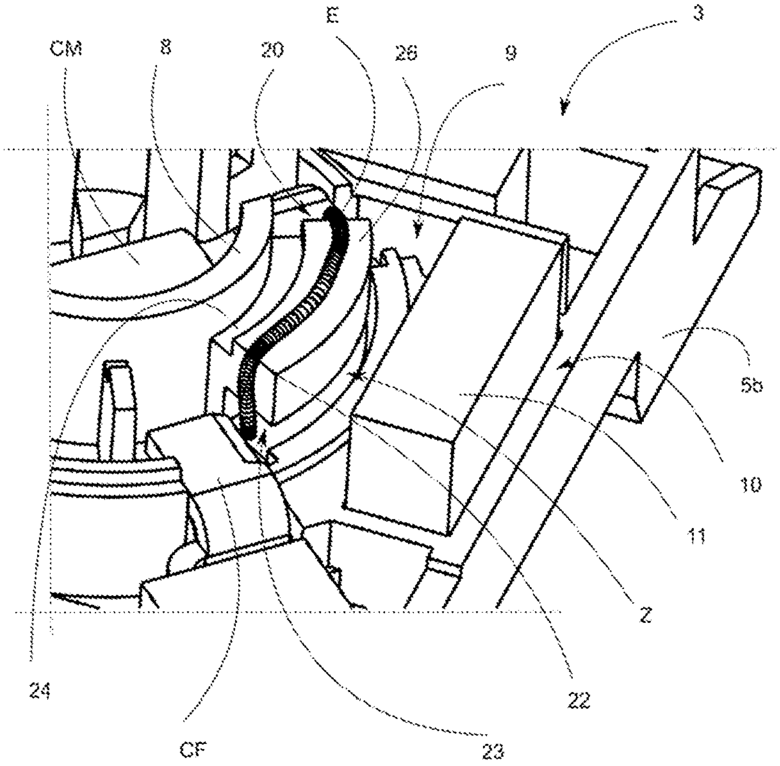
FIG. 16 is a perspective view, similar to FIG. 4, of the breaking module shown in FIG. 3, showing a further variant of the magnetic blow-out device.

The movable deflector 20, as described with reference to FIGS. 2 to 7, is formed by fins 25 embedded in or integrally linked to the rotating spindle 8 of the movable contact CM. In the variant shown in FIG. 16, the deflector 20 consists of a solid one-piece part 26, which is also movable and integral with the rotating spindle 8 of the CM moving contact. This solid one-piece part 26 can have a similar geometry to the fins 25, i.e., a C-shaped cross-section symmetrical to the breaking plane P. It thus comprises two lugs 22, a central opening 23 and a guide shoulder 24. In this variant, a lateral clearance between the deflector 20 and the inner walls of the housing 5 is necessary to create unidirectional exhaust columns favoring the expansion of the arc plasma towards the confinement zones 21 and consequently the displacement and stretching of the electric arc E perpendicular to the breaking plane P into these arc confinement zones 21. The deflector 20 can also consist of a perforated part, not shown, provided with slots, orifices, or the like to allow the arc plasma to pass through.

Figure 8:
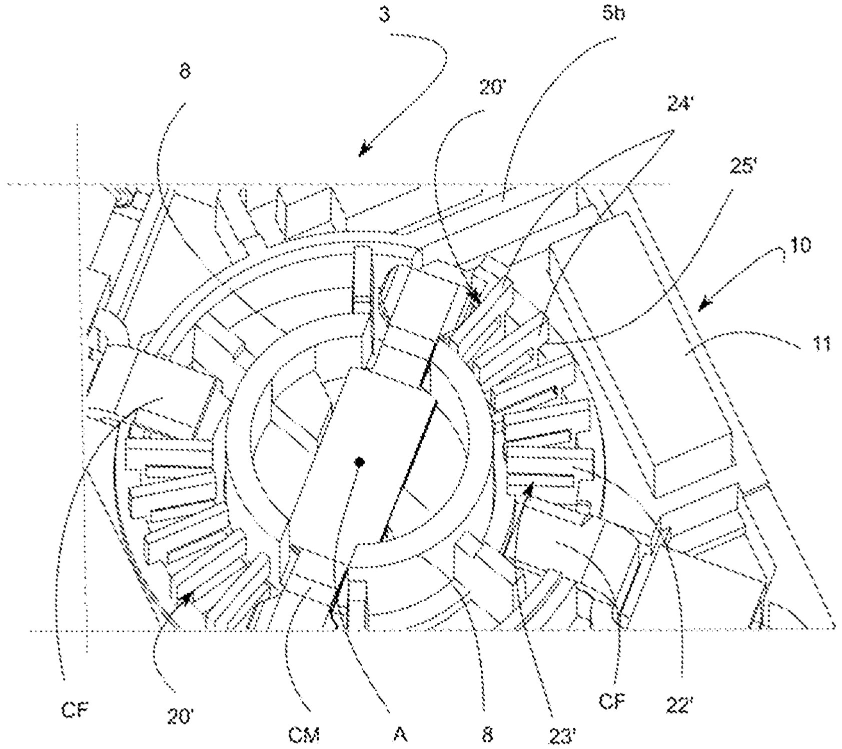
FIG. 8 is a view similar to FIG. 4, showing a variant of the magnetic blow-out device.
Figure 9:
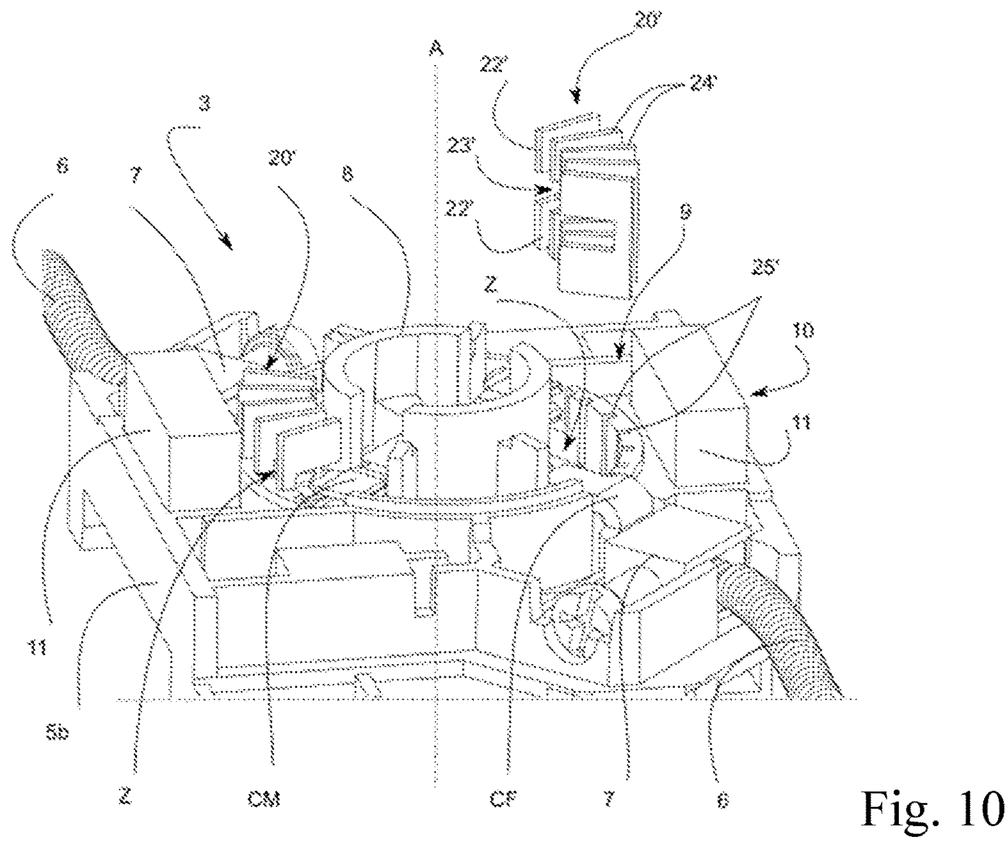
FIG. 9 is an exploded view of part of the magnetic blow-out device shown in FIG. 8.
Figure 10:
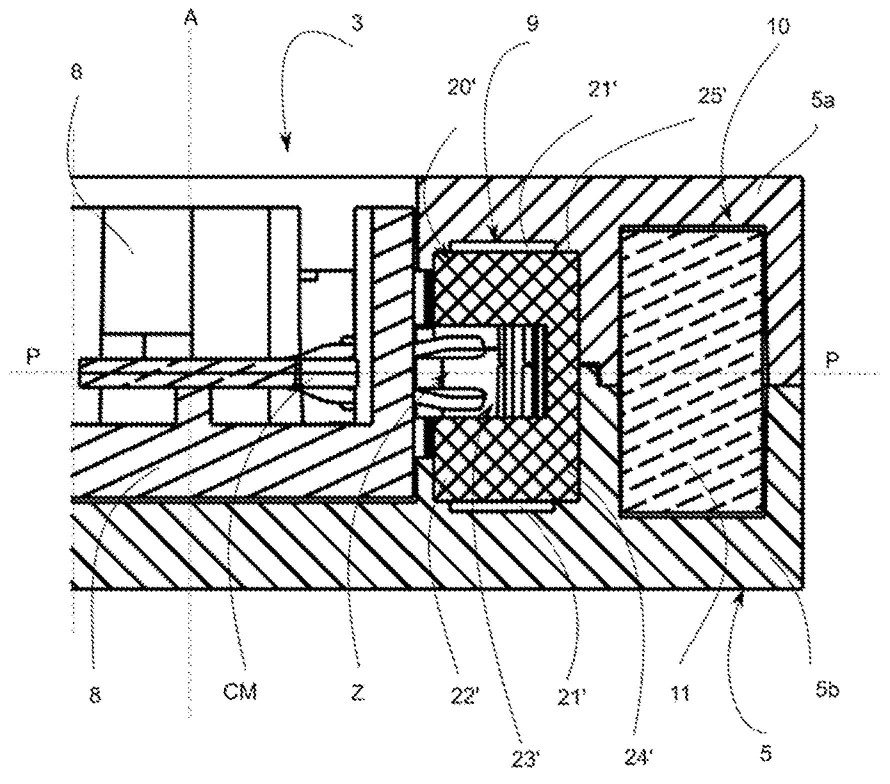
FIG. 10 is a partial cross-sectional view, similar to FIG. 7, of the breaking chamber and magnetic blow-out device shown in FIG. 8.

FIGS. 8 to 10 illustrate another variant of a deflector 20' which is fixed and attached to the housing 5. In this example, the deflector 20' is made up of a plurality of individual, C-shaped plates 24', symmetrical with respect to the breaking plane P and fitted in lateral grooves 25' provided in an inner wall of the housing 5, opposite the breaking zones Z. In this example, the deflector 20' is made up of five plates 24', without this number being limitative. The plates 24' are oriented perpendicularly to breaking plane P. They are distributed over breaking zone Z, which extends over an angular sector, in the case of a rotating breaking module. The interval between two consecutive plates 24' is regular, but could be irregular. This example is therefore not limitative. The gaps between the plates 24' of the deflector 20' form unidirectional exhaust columns that promote arc plasma expansion in the direction of the electromotive force F and towards the confinement zones 21'.

These examples of deflector 20, 20' are of course not limitative, and other modes of implementation and/or geometric shapes are possible insofar as they form non-magnetic physical obstacles in the path of the blown electric arc E, which occupy and fill the breaking chambers 9 to reduce to a minimum the volume of air remaining in narrow spaces, baffles and/or exhaust columns, having the effect of constraining and deflecting the path of the arc plasma and therefore of the electric arc between non-conducting walls. The deflector 20, 20' can also be made of a one-piece openwork part, not shown, for example with slots, orifices, pores or the like running through it to allow the arc plasma to expand in the direction of the electromotive force F and towards the confinement zones 21, 21'.

Figure 11:
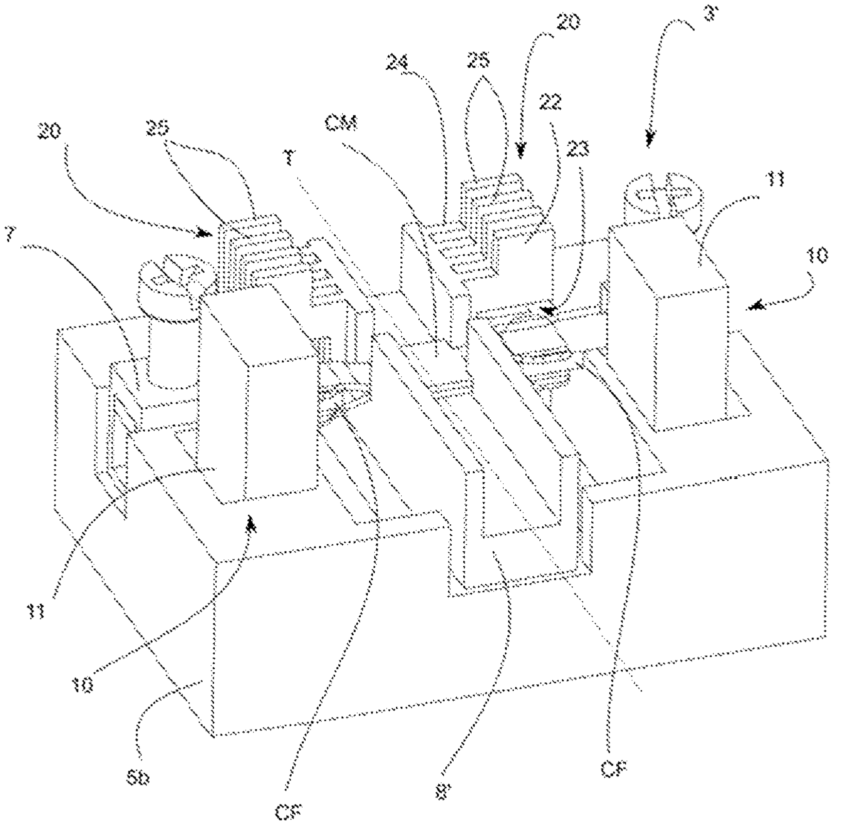
FIG. 11 is a top perspective view of a linear breaking module of another breaking apparatus according to the invention, in the closed position.
Figure 12:
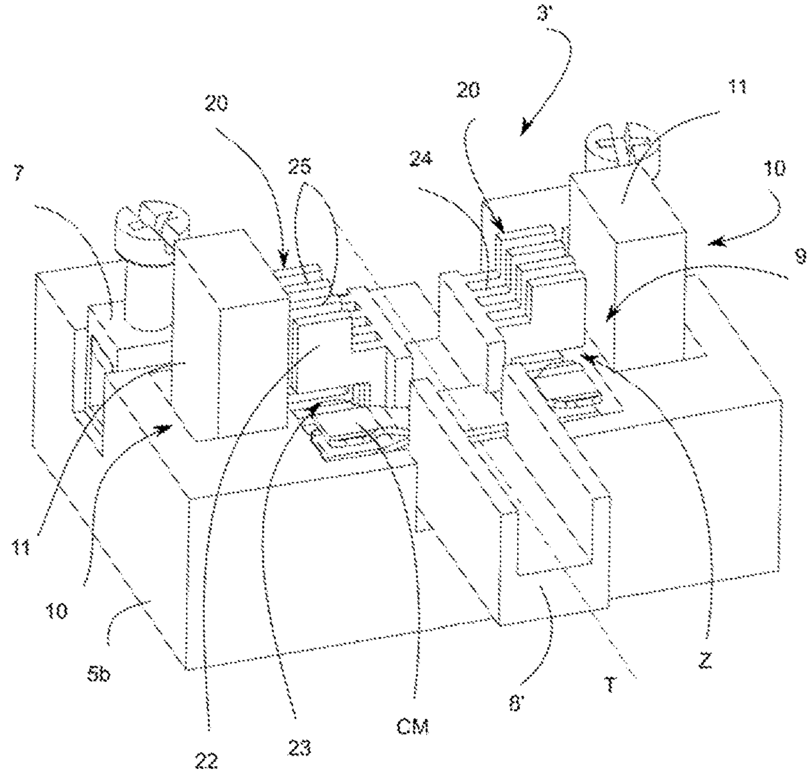
FIG. 12 is a top perspective view of the breaking module shown in FIG. 11, in the open position.
Figure 13:
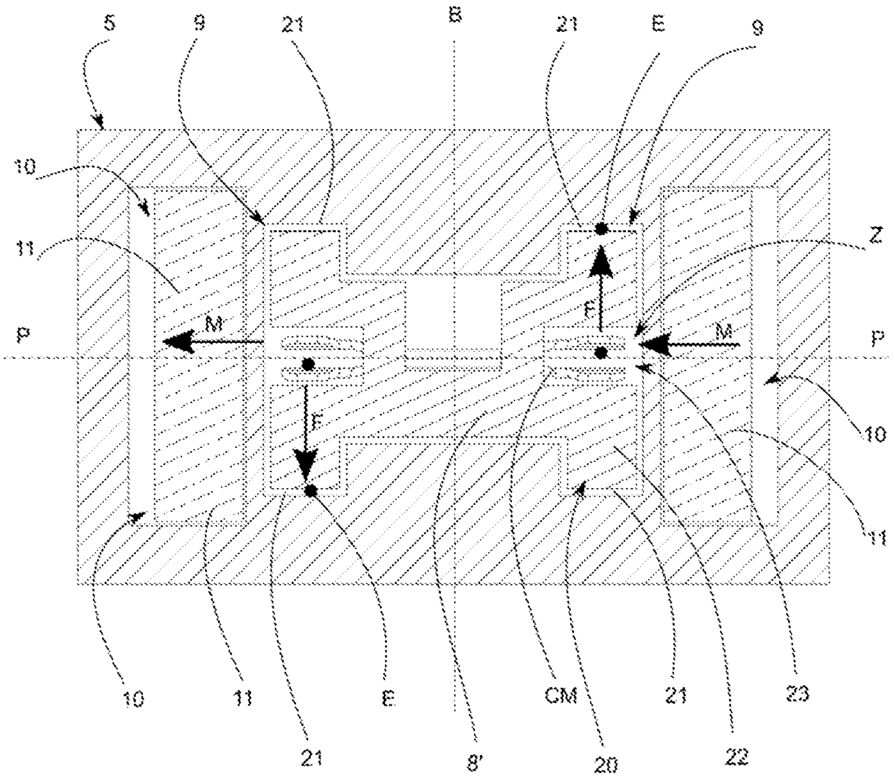
FIG. 13 is a cross-sectional view of the breaking module shown in FIG. 12 to the right of the breaking chambers and magnetic blow-out devices.

The breaking principle of the invention also applies to so-called linear breaking modules 3', as opposed to the rotary breaking modules 3 described above. With particular reference to FIGS. 11 to 13, the breaking module 3' is doubled, with two fixed contacts CF and one moving contact CM mounted on an insulated linear carriage 8'. The linear carriage 8' is driven in reciprocating translation along a axis T, by a snap-action mechanism (not shown) provided in a control module (not shown). The linear breaking module 3' is substantially similar in construction to the rotary breaking module 3 of FIGS. 2 to 7, in that it is symmetrical both with respect to a median plane B perpendicular to breaking plane P passing through the axis T, and with respect to said breaking plane P. As explained with reference to the rotary breaking module 3, symmetry of the module in both planes P and B is not a requirement, and an asymmetrical design can be envisaged, without calling into question either the operation or the non-polarity of the magnetic blow-out devices 10.

The linear breaking module 3' also includes two symmetrical breaking chambers 9, in line with two breaking zones Z, a magnetic blow-out device 10 with two symmetrical magnets 11 facing each of the breaking zones Z, and two symmetrical deflectors 20 mounted on the linear carriage 8'. These deflectors 20 also have the same configuration as the deflectors 20 of FIGS. 2 to 7, bear the same numerical references, and are not described again. As shown in FIG. 13, the deflectors 20 fill the breaking chambers 9, and together with the inner walls of the housing 5, define confinement zones 21 in which electric arc E is deflected, stretched, and constrained when it is blown magnetically by the magnets 11.

Figure 14:
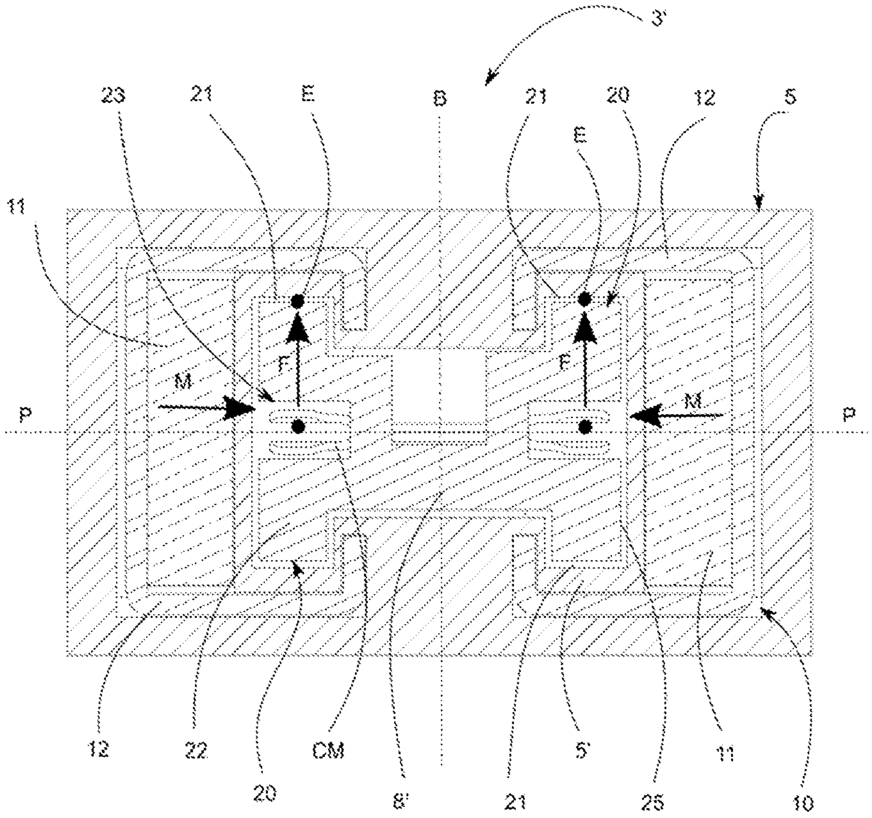
FIG. 14 is a cross-sectional view of the breaking module shown in FIG. 12, according to another variant of the magnetic blow-out devices.

In addition, and in all the variants described, the magnetic blow-out device 10 can be amplified by the addition of a ferromagnetic or similar housing 12, the effect of which is to channel and concentrate magnetic field M induced by magnet 11 of magnetic blow-out device 10 in each breaking chamber 9. In the example shown in FIG. 14, carcass 12 is C-shaped, symmetrical to breaking plane P, and surrounds magnet 11 and deflector 20. It is also insulated from deflector 20 by an inner wall 5' of housing 5. The shape of carcass 12 can be different depending on the architecture of magnetic blower 10 and breaking module 3, 3'.

Figure 15:
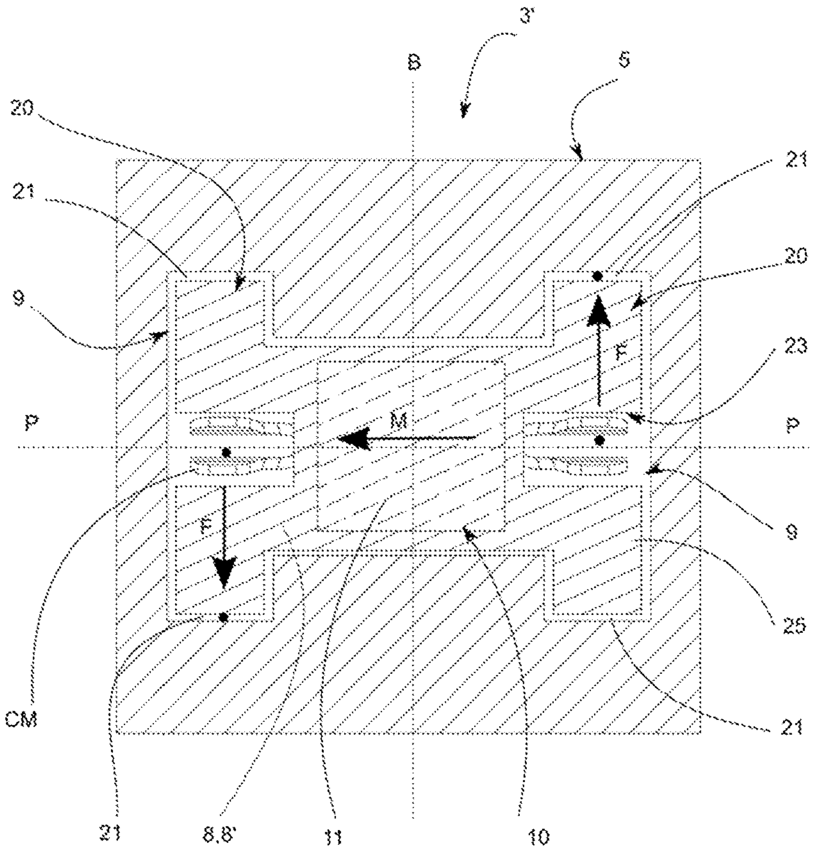
FIG. 15 is a cross-sectional view of the breaking module of FIG. 12 according to a variant of the magnetic blow-out device.

The magnetic blow-out device 10, when used in double breaking modules 3, 3', as shown in the various FIGS. 2 to 14, may be equipped with only one magnetic field source 11, which in this case is common to both breaking chambers 9. An example is shown in FIG. 15, in which the magnet 11 of the magnetic blow-out device 10 is movable, embedded in the movable contact CM, and attached to or integrated in the rotating spindle 8 or the linear carriage 8'. This variant makes the breaking module 3, 3' more compact and combines the magnetic effect of a single magnet 11 facing two opposite breaking zones and blow-out arcs E into two opposite breaking chambers 9.

This invention is of course not limited to the embodiments described, but extends to any modifications and variants obvious to a person skilled in the art, within the limits of the appended claims. In addition, all or some of the technical characteristics of the above-mentioned embodiments and variants may be combined with each another. Furthermore, the arrows M and F, which respectively represent the magnetic excitation vector in the figures, generated by each magnetic field source 11 and the corresponding induced electromagnetic force, may be oriented differently as a function of both the polarity of said magnetic field source 11 and the direction of the current flowing in each breaking chamber 9, without thereby departing from the protective scope of the invention.

The invention claimed is:

1. An electrical breaking module equipped with a magnetic blow-out device, said breaking module comprising a non-magnetic, electrically insulating housing, in which at least one fixed contact and one moving contact are housed, said moving contact being arranged to move relative to said fixed contact between a closed position and an open position and vice versa on a trajectory defining a breaking plane, said fixed contact and said movable contact defining between them a breaking zone extending into said breaking plane, into which an electric arc extends at an origin thereof, when an electrical circuit is opened, said breaking module comprising at least one breaking chamber delimited by inner walls of said housing and comprising said breaking zone for managing said electric arc in order to break a current, said magnetic blow-out device comprising at least one magnetic source field arranged in said breaking chamber opposite said breaking zone, characterized in that said at least one magnetic source field is oriented to generate at least one magnetic excitation vector substantially parallel to said breaking plane so that induced electromagnetic force displaces and stretches said electric arc in a direction substantially perpendicular to said breaking plane towards the housing, and in that said magnetic blow-out device further comprises at least one non-magnetic and electrically insulating deflector arranged in said breaking chamber to form a physical obstacle in a path of the electric arc when the electric arc is magnetically blown-out, said deflector consisting of a solid one-piece part or of an openwork one-piece part, the deflector occupying most of a space existing between said breaking zone and said housing in a direction of said electromagnetic force, or said deflector consisting of a plurality of fins or plates spaced apart and oriented substantially perpendicular to said breaking plane in a direction of said electromagnetic force, each fin or plate occupying most of a space corresponding to a thickness of the fin or plate and existing between said breaking zone and said housing in the direction of said electromagnetic force, so as to create at least one arc confinement zone in a narrow gap remaining between insulating walls of said deflector and those of said housing, into which said electric arc is deflected and constrained when magnetically blown out, to promote cooling and extinction of said electric arc.

2. The electrical breaking module according to claim 1, characterized in that said breaking chamber extends on either side of said breaking plane and said deflector also extends on either side of said breaking plane to define at least two confinement zones in opposition with respect to said breaking plane.

3. The electrical breaking module according to claim 2, characterized in that said breaking chamber is symmetrical with respect to said breaking plane and said deflector is symmetrical with respect to said breaking plane.

4. The electrical breaking module according to claim 1, characterized in that said deflector is movable and integral with said movable contact.

5. The electrical breaking module according to claim 1, characterized in that said deflector is fixed and integral with said housing.

6. The electrical breaking module according to claim 1, characterized in that said deflector has a C-shaped cross-section, substantially symmetrical with respect to the breaking plane, comprising two lugs separated by a central opening arranged to free a passage for relative displacement of said movable contact or said fixed contact depending on whether said deflector is fixed or movable.

7. The electrical breaking module according to claim 1, characterized in that said magnetic blow-out device comprises at least one carcass arranged to channel magnetic flux induced by said at least one magnetic field source.

8. The electrical breaking module according to claim 7, characterized in that said carcass is integrated into the housing and arranged around at least said magnetic field source and said deflector.

9. The electrical breaking module according to claim 1, characterized in that said at least one field source is static and integral with said housing.

10. The electrical breaking module according to claim 1, characterized in that said at least one field source is movable and integral with said movable contact.

11. The electrical breaking module according to claim 1, characterized in that said movable contact is rotatable about a central axis or translatable parallel to said breaking plane.

12. The electrical breaking module according to claim 1, comprising two fixed contacts symmetrical with respect to a central axis or a median plane of said housing, and a movable contact common to the two fixed contacts defining two symmetrical breaking zones, said breaking module comprising two symmetrical breaking chambers, characterized in that said breaking module further comprises at least two non-magnetic, and electrically insulating deflectors, each arranged in one of the breaking chambers.

13. An electrical breaking apparatus comprising at least one control module and a breaking module according to claim 1.

* * * * *